3,457,234
POLYURETHANE ELASTOPLASTIC RESISTANT TO HIGH SPEED FLEXURAL IMPACT AND GEAR MADE THEREFROM
Philip A. Gianatasio, Waterbury, Conn., assignor to Uniroyal, Inc., a corporation of New Jersey
Filed Feb. 16, 1967, Ser. No. 616,712
Int. Cl. C08g 22/10, 22/04
U.S. Cl. 260—75                             2 Claims

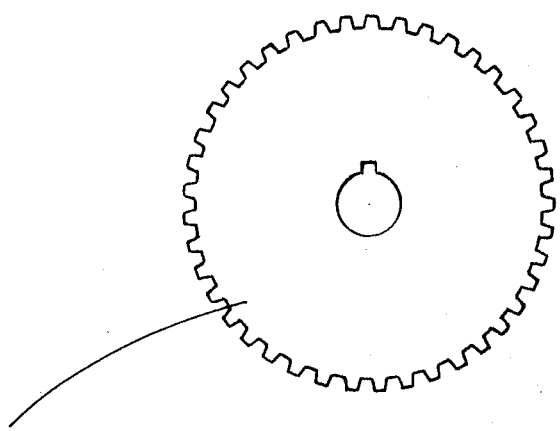
GEAR OF POLYURETHANE ELASTOPLASTIC MADE FROM:
(A) LIQUID POLYURETHANE BASED ON
 (a) PREPOLYMER OF
  (i) ETHYLENE GLYCOL – ADIPIC ACID POLYESTER
  (ii) 2,4 – TOLYLENE DIISOCYANATE
 AND
 (b) 3,3' – TOLYLENE – 4,4' – DIISOCYANATE
CURED WITH
(B) MIXED DIAMINE CURATIVE OBTAINED BY CONDENSING 2-CHLOROANILINE AND 2,5-DICHLOROANILINE WITH FORMALDEHYDE
INVENTOR.
PHILIP A. GIANATASIO
BY James J. Long
AGENT United States Patent Office 3,457,234
Patented July 22, 1969

ABSTRACT OF THE DISCLOSURE

Liquid polyurethane composition, made by mixing 3,3'-bitolylene-4,4'-diisocyanate with a polyurethane prepolymer which is a reaction product of ethylene adipate polyester with an excess of 2,4-bitolylene diisocyanate, is cured to an elastoplastic state, in the shape of a gear for example, by the action of a mixed diamine curative (mixed condensation product of 2-chloroaniline and 2,5-dichloroaniline with formaldehyde) to yield a hard, solid product which is resistant to high speed flexural impact.

CROSS REFERENCES TO RELATED APPLICATIONS

The mixed diamine curative employed in this invention, and the curing of polyurethanes therewith by liquid casting technique, is the subject of copending application Ser. No. 406,878 of Norman K. Sundholm, filed Oct. 27, 1964, now U.S. patent 3,379,691.

BACKGROUND OF THE INVENTION

Field of the invention

This invention relates to a hard polyurethane elastoplastic characterized by resistance to high speed flexural impact, and to a gear made of such elastoplastic.

Description of the prior art

Many polyurethane elastoplastics have previously been known, but they have not provided the combination of properties or advantages with which the present invention is concerned.

Gears made of various synthetic plastic materials have also been known but these have not had the combination of desirable advantages made possible by the present invention.

SUMMARY OF THE INVENTION

The invention is based on the unexpected discovery that an elastoplastic polyurethane material having unusual resistance to high speed flexural impact, and other advantages, is provided by curing (A) with (B), (A) being a liquid mixture of
  (a) A liquid isocyanate-terminated polyurethane prepolymer which is a reaction product of
  (i) an hydroxy-terminated ethylene glycol-adipic acid polyester having a molecular weight of from 1000 to 1300, with
  (ii) 2,4-tolylene diisocyanate in amount sufficient to provide from about 6.4 to about 7.7% by weight of available isocyanate, based on the weight of the prepolymer, and
  (b) 3,3'-bitolylene-4,4'-diisocyanate in amount sufficient to bring the available isocyanate content to from about 8.7 to about 10% by weight, based on the weight of (a) plus (b), and (B) being the mixture of diamines obtained by condensation in the presence of an acid of 2-chloroaniline, 2,5-dichloroaniline, and formaldehyde in which the molar ratio of 2-chloroaniline to 2,5-dichloroaniline is in the range from 9:1 to 1:2 and the molar ratio of the sum of the two amines to formaldehyde is from about 2:1 to 10:1. The cure of the liquid polyurethane preparation (A) is accomplished by mixing (A) with the curative substance (B) and subjecting the mixture to curing conditions, whereby there is formed a hard, cured or cross-linked (thermoset) material that not only has a high impact strength but is unusually useful in the form of a gear. Typically the mixture of liquid prepolymer preparation (A) and mixed diamine curative substance (B) is poured into a suitably shaped mold wherein the cure takes place to form an object of the desired shape such as a gear.

The present cured reaction product of (A) and (B) is an elastoplastic polyurethane capable of impact strengths of the order of 25 and more foot-pounds, not uncommonly 30 or more foot-pounds (e.g., 35–45 foot-pounds) per inch of notch. In many cases, samples of the present product will not break using the maximum force available on the impact apparatus. This amazing impact strength contrasts to the typical mere 0–10 foot-pounds per inch of notch for elastoplastics made from the same prepolymer mixture (A) but cured with other conventional diamine curatives such as MOCA (4,4'-methylene-bis-2-chloroaniline), or elastoplastics made from other conventional polyurethane prepolymers cured with the presently employed mixed diamine curative (B).

The poor impact strength of prior hard (maximum hardness approximately 75–80 Shore D) polyurethane elastoplastic materials was a major disadvantage which limited the use of these prior elastoplastic materials in many applications. This poor impact resistance led to cracking or splitting of the brittle material in application or in some cases during shipment.

To achieve the present high impact strength it is necessary to employ the critical combination of the particular described polyurehtane prepolymer composition (A) and the particular described mixed diamine curative (B). Substitution of other polyurethane prepolymer compositions for (A) and/or substitution of other diamine curatives for (B) does not provide the present results, in the experience of the present inventor.

Even in those instances where the present polyurethane preparation (A) cured with MOCA instead of the curative (B) does display apparently high impact strength in the ordinary Izod notched impact test, the product nevertheless displays a brittle type of break, as opposed to the non-brittle type of break observed when the present curative (B) is used. Typically the present product made with the curative (B) leaves a small hingelike skin connecting the two halves of the test piece, whereas the MOCA-cured product frequently shatters with fragments of the test piece flying from the test apparatus. In a high speed flexural impact test the unique characteristic of the present product, as opposed to a MOCA-cured product, becomes particularly apparent. Finally, the superior behavior of the present material in the form of a gear brings out in striking fashion the difference between the product of the invention and prior products which were unsatisfactory for use as gears.

The present polyurethane composition (A) diamine curative (B) critical combination enables the cured elastoplastic to be used in the field in applications where polyurethane elastomers have not before met satisfactory performance. One such application is heavy duty gears for such equipment as tire building, bead wrapping and rubber, mill equipment. Manufacturers have stated that no other polyurethane elastomer has ever looked promising in this field. The invention makes it possible to take advantage, in gears, of several other characteristics, namely, self-lubrication (period oiling not necessary), high abrasion resistance, high shock absorbing qualities, less noise compared to metal, and ability to be molded to the desired shape. The gear industry has not previously been able to take advantage of these properties due to the short life of previous gears, resulting from brittle breakage of the teeth.

DESCRIPTION OF THE DRAWING

In the accompanying drawing the single figure depicts a gear of the invention.

Description of preferred embodiments

In practicing the invention, there is first provided a liquid polyurethane prepolymer composition (A) which is a mixture of (a) and (b), (a) being a liquid reaction product of (i) ethylene adipate polyester with (ii) an excess of 2,4-tolylene diisocyanate ("TDI"), and (b) 3,3'-bitolylene-4,4'-diisocyanate ("TODI"). The ethylene adipate polyester (i) is made by condensing ethylene glycol and adipic acid in the conventional manner to produce an hydroxy-terminated material having a molecular weight within the range of from 1000 to 1300. In combining the ethylene adipate polyester (i) with the 2,4-TDI (ii) and TODI (b) a high level of isocyanate is used and a two step procedure is required in order to attain the results achieved by the invention. In step one the polyester is reacted with 2,4-TDI in a proportion sufficient to provide about a 7% by weight of available isocyanate, based on the weight of the prepolymer. The method of calculating the appropriate weight of TDI in any given case will be apparent to those skilled in the art. Thus, for example, assuming that the molecular weight of the hydroxy terminated polyester is 1200, its equivalent weight with respect to ability to react with isocyanate will be 600 since there are two hydroxyl groups per molecule. The amount of TDI employed will also take into account the small amount of water frequently present in the polyester, typically about 0.02% water, which consumes some of the isocyanate. If there is added, to each equivalent (600 grams) of such polyester, 2.35 equivalents (204.6 grams) of 2,4-TDI, there will be produced a prepolymer having an equivalent weight (also called "amine equivalent") of 600 and containing 7% by weight of available isocyanate. In this exemplification, the amount of 2,4-TDI to be used, in parts per 100 parts of polyester, may be calculated from the following data:

A  Weight of polyester _____ 100
B  Equivalent weight of polyester _____ 600
C  Weight of TDI to be used _____ ?
D  Equivalent weight of TDI _____ 87
E  Weight of water present _____ .02
F  Equivalent weight of water _____ 9
G  Desired equivalent weight of prepolymer _____ 600

The relationship between these values is given by the equation:

$$\frac{A+C+E}{G} = \frac{C}{D} - \frac{A}{B} - \frac{E}{F}$$

Substituting:

$$\frac{100+C+0.02}{600} = \frac{C}{87} - \frac{100}{600} - \frac{.02}{9}$$

C=34.1 parts TDI

That is, 34.1 parts TDI will be employed in this case per 100 parts polyester, or 0.392 equivalent of TDI per 0.166 equivalent of polyester (2.35 equivalents of TDI per equivalent of polyester). In the thus-resulting prepolymer the weight-percentage of reactive isocyanate is given by the expression $$\text{Percent } NCO = \frac{H}{G} \times 100$$

where H is the equivalent weight of the isocyanate radical and G is the equivalent weight of the prepolymer, or $$\text{Percent } NCO = \frac{42 \times 100}{600} = 7\%$$

In the first step of the preparation of the liquid polyurethane composition (A), the polyurethane prepolymer (a) is prepared by heating the mixture of polyester (i) and 2,4-TDI (ii) until reaction between the polyester and the 2,4-TDI is substantially completed (usually heating at a temperature of from 65 to 80° C. for a period of from ½ hour to 1½ hours is sufficient). The resulting prepolymer is a liquid material which is a linear isocyanate-terminated polyurethane.

In the second step of the polyurethane preparation the prepolymer product (a) from step one is mixed with (b) TODI in a proportion required to bring the amount of available reactive isocyanate up to the range of 8.7 to 10% by weight, based on the weight of the prepolymer (a) plus TODI (b). Again, those skilled in the art will readily understand how to calculate the amount of added TODI required to do this. Thus, starting with the previously exemplified prepolymer having an equivalent weight of 600 and containing 7% available TDI, the amount of TODI required to bring the content of available isocyanate to 9.35, for example, may be calculated as 10.4 parts per 100 parts of prepolymer, assuming a desired equivalent weight of 450 for the product. The following data may be used:

K  Desired equivalent weight (amine equivalent) of product _____ 450
L  Weight of prepolymer from step 1 _____ 100
G  Equivalent weight of prepolymer from step 1 ___ 600
M  Weight of TODI to be used _____ ?
N  Equivalent weight of TODI _____ 132

The relationship between these values is given by the equation:

$$\frac{L+M}{K} = \frac{L}{G} + \frac{M}{N}$$

Substituting:

$$\frac{100+M}{450} = \frac{100}{600} + \frac{M}{132}$$

M=10.4 parts of TODI

In the product the weight-percent of available isocyanate is given by the expression:

$$\%NCO = \frac{H}{K} \times 100$$

where H is again the equivalent weight of the isocyanate group and K is the equivalent weight of the polyurethane composition, or $$\%NCO = \frac{42 \times 100}{450} = 9.35\%$$

In this second step the TODI is mixed thoroughly with the prepolymer. Mixing is greatly facilitated by heating the prepolymer, for example, at a temperature of from 65° to 80° C., at which temperatures mixing times of the order of ¼ hour to 1½ hours will ordinarily be ample with a good mixing device. The resulting polyurethane composition is a liquid material, containing the linear isocyanate-terminated prepolymer in admixture with the TODI. It typically has an amine equivalent (amount required to react with an active amine hydrogen as defined by Zerewitinoff) of from 400 to 500.

This particular combination of reactants, in the described two-step procedure, is required to produce the present unique characteristics, when cured with the mixed diamine curative that will now be described.

The mixed diamine curative (B), the use of which along with the prepolymer (a) is a unique and critical feature of the invention, is, as described in previously mentioned copending application Serial No. 406,878 (U.S. Patent 3,379,691), a mixture of diamines obtained by condensing formaldehyde with certain mixtures of 2-chloroaniline and 2,5-dichloroaniline in the presence of an acid. The compositions are evidently mixtures to a large degree of 4,4'-methylenebis(2-chloroaniline), 2,5-3'-trichloro-4,4'-diaminodiphenylmethane and 4,4'-methylenebis (2,5-dichloroaniline). Particularly suitable curatives are those prepared from mixtures of 2-chloroaniline and 2,5-dichloroaniline in which the molar ratio of monochloroaniline to dichloroaniline is in the range 9:1 to 1:2. Condensation products produced from mixtures richer in the monochloroaniline react too rapidly. Products from mixtures richer in the dichloroaniline melt undesirably high.

The amount of formaldehyde used should be such that the molar ratio of the total amines to the formaldehyde is at least about 2:1, that is, about 2:1 or higher (e.g., 4:1, 5:1, 10:1, or more). Unreacted amines are removed from the condensation products by vacuum or steam distillation.

The condensations are carried out in inert solvents. The lower alcohols, such as methanol, ethanol, the propanols, and the butanols, are preferred; but water, ethers, lower aliphatic acids, aromatic hydrocarbons, etc., are also suitable.

The condensation is promoted by acids; it is preferred to use one of the strong mineral acids such as hydrochloric or sulfuric, but other inorganic or organic acids may be used such as phosphoric, p-toluene-sulfonic, oxalic, dichloroacetic, and trichloroacetic. The amount of acid used is not critical, it is not necessary to use one equivalent of acid per mol of total amines. For example, when hydrochloric acid is used with ethanol as the solvent, 0.38, 0.5, 1.5, and 3 equivalents of acid per mole of total amines give high yields of products having similar, maximum properties; when 0.25 equivalent is used, a product of lower quality is obtained in reduced yield. When 1 equivalent of sulfuric acid is used, good results are obtained. When hydrochloric acid is used with water as the solvent, 1,2, and 3 equivalents of acid per mole of total amines give high yields of products having good properties. The useful amounts of acid are usually within the range from 0.25 to 3 equivalents of acid per mole of total amines, but 0.1 to 10 equivalents may be used.

The condensations are best carried out at moderately increased temperatures; the preferred temperature range is 50–100° C., although lower and higher temperatures may be used (e.g., 20–150° C.).

The preparation of such a mixed diamine curative, in which the molar ratio of 2-chloroaniline: 2,5-dichloroaniline:formaldehyde is 3:1:1, is as follows:

To a stirred solution of 76.5 grams (0.6 mole) of 2-chloroaniline and 32.4 grams (0.2 mole) of 2,5-dichloroaniline in 500 ml. of ethanol was added 66.7 ml. (0.8 mole) of concentrated hydrochloric acid. The stirred mixture was heated to 70° C. and 16.2 grams (0.2 mole) of 37% formaldehyde added dropwise during one hour. After completion of the addition, the mixture was heated at 70° C. for two hours, and then ethanol distilled until the residue was a paste. About 800 ml. of warm water and 60 ml. of 28–30% aqueous ammonia were added. The organic layer was subjected to steam distillation to remove excess of monochloro- and dichloroanilines. The residual oily layer solidified on cooling; it was collected by filtration, washed with water, and dried. It weighed 58 grams and melted at 105–110° C. It analyzed for 31.1% chlorine.

To cure the polyurethane prepolymer (A) with the mixed diamine curative (B) the liquid prepolymer and curative are blended together, conveniently at an elevated temperature to facilitate thorough and rapid mixing, in the conventional manner. Thus, prior to mixing, the liquid prepolymer is conveniently heated to a temperature between 160° and 212° F. The curative to be mixed in is generally heated sufficiently to melt it, e.g., to between 225° and 235° F. (107° and 113° C.) in accordance with conventional practice. Lower prepolymer temperatures (e.g., 100° F. (38° C.) or less) may be used but lower temperatures make it difficult to maintain the curative in the molten state during mixing or blending. There is no upper limit on the prepolymer temperature during the mixing other than the degradation point of the prepolymer or a temperature above which the prepolymer is no longer stable and may yield erratic results. It should be noted that the higher temperature tends to shorten the pot life of the mixture. The curative is employed above its melting temperature (which is frequently 212°–230° F.) (100°–113° C.) and below its degradation temperature. The preheated materials are simply blended together and the mix may then be cast in a mold of the desired shape.

For purposes of the invention, the amount of curative (B) employed will be sufficient to provide from about 0.5 to 1.1 equivalents of amine per isocyanate equivalent in the polyurethane composition (A).

The composition may further include fillers, pigments or other compounding ingredients such as stabilizers which are conventional in the polyurethane elastomer field.

When the hot mixture of liquid prepolymer composition (A) and diamine curative (B) is poured into the mold the cure (cross-linking) advances itself and the mixture turns into a solid, hard material. Heat may be applied to the mold (and/or the mold may be preheated) to shorten the time of cure, as in conventional practice. The cast article is removed from the mold when the cure is substantially completed, usually after a heating period of from 3 minutes to 2 hours at a mold temperature of from 350° to 75° F. (177° to 24° C.), depending upon such variables as the particular materials and proportions, the size of the article, the character of the heating device, etc. Although the molded material is described as "substantially cured" it will be understood that polyurethane elastomers frequently continue to "cure," as evidenced by progressive improvement in properties, sometimes for a period of weeks after they have been removed from the mold. Sometimes this continued curing is hastened by a so-called post cure cycle (i.e., additional heating), frequently performed outside the mold.

The cured polyurethane elastoplastic material of the invention typically has a hardness value of from 65 to 80 on the Shore D scale and ranges up to a value in excess of the maximum capacity of the impact testing machine, which is 67 foot-pounds per inch of notch. Such high impact strength is particularly remarkable in a hard polyurethane composition.

Gears formed by molding the composition (or if desired by other means such as by machining from a cured blank) have surprisingly improved performance in comparison to gears made of conventional cured polyurethane elastoplastics. So tough are the gears of the invention that they are especially adapted for heavy duty use, in such equipment as tire building, bead wrapping and rubber mill equipment. It is believed that prior to the invention no other polyurethane elastomer has ever looked promising in their field. A major disadvantage of prior hard polyurethanes was their poor impact resistance. This led to cracking or splitting of this brittle material in application or in some cases in shipment.

Gears of the invention make it possible to take advantage of the self-lubricating properties of polyurethanes, that is, periodic oiling is not necessary. High abrasion resistance, high shock absorbing qualities, less noise compared to metal, and ability to be molded to the desired shape are further advantages of polyurethanes which the invention makes it possible to enjoy. The gear industry has previously not been able to take advantage of these properties due to the short life of previous gears resulting from brittle breakage of the teeth.

The fact that the presently specified mixed diamine curative (B) produces a high impact strength with the presently employed prepolymer composition (A) whereas the more conventional curative MOCA does not, is particularly surprising in view of the fact that in many cases the substitution of the present mixed diamine curative (B) for MOCA in high hardness polymers (other than polymer composition (A)) has actually resulted in a lowering of the impact strength of these elastomers. Based on this, it could not have been predicted that the present particular combination of (A) and (B) would produce a polyurethane polymer with the unique combination of high impact resistance and high extensibility due to extremely low brittleness characteristics.

The unusual durability of the gears of the present invention is particularly surprising in view of the fact that it has been observed that the presence of high impact strength per se does not necessarily mean that an acceptable heavy duty gear can be made from the material.

Especially remarkable is the behavior of the present cured polyurethane elastoplastic in a high speed flexural impact tester at 18,000 inches per minute. The present material does not shatter or break, nor does it retain any permanent deformation, whereas other materials with apparently similar notched Izod impact strength shatter in this test.

The unusual resistance of the product of the invention to breakage when subjected to high speed impact may be demonstrated in conventional testing machinery such as the commercially available machine known as the Plastechon Model 591 Universal Tester capable of providing loading rates of from 10 inches per minute to 18,000 inches per minute. The load is applied to the test specimen by a hydraulically driven piston. The flexural test may be performed on a rectangular test specimen, measuring for example 6 inches by ½ inch by ¼ inch. The sample may be supported horizontally on supports spaced 2 inches apart, and the load may be applied vertically downwardly to the top surface of the specimen, midway between the supports. Specimens of the cured product of the invention may be subjected to loads at speeds varying from 200 in./min. up to 18,000 in./min., the applied force varying from 1200 p.s.i. up to 2700 p.s.i., without breaking. In contrast, materials made by substituting other prepolymers for present prepolymer composition (A) and/or by substituting other curatives such as MOCA for the present mixed diamine curvative (B), even though in certain cases they may display apparently high impact strength in the ordinary notched Izod test, nevertheless fail when subjected to the high speed impact flexural test.

The following examples, in which all parts are expressed by weight unless otherwise indicated, will serve to illustrate the practice of the invention in more detail.

EXAMPLE I

A. Preparation of prepolymer

To prepare the liquid polyurethane prepolymer, there is employed an hydroxy-terminated ethylene glycol-adipic acid linear polyester having a molecular weight of 1200, an acid value less than 1, water content not more than 0.1%.

Step 1.—100 parts of the polyester is heated to a temperature of 70° C. in a vessel equipped with a mechanical stirrer, under a blanket of dry nitrogen, 34.1 parts of 2,4-TDI (that is 2.35 moles of 2,4-TDI per mole of polyester) is added and stirring and heating are continued at a temperature of 75° C. for a period of 40 minutes. At the end of this time the reaction between the polyester and the diisocyanate to form an isocyanate-terminated polyurethane is substantially complete. This intermediate preparation has an amine equivalent of 600.

Step 2.—To 100 parts of the product of Step 1, heated to a temperature of 75° C., is added 10.4 parts of TODI. Heating at 75° C. with stirring is continued for about 15 minutes to get a good mix, between the TODI and the intermediate polyurethane. The amine equivalent of the resulting composition is about 450.

B. Curing of prepolymer composition 100 parts of the prepolymer composition prepared in part A is preheated to a temperature of 160° F. 30 parts of mixed diamine curative (prepared by acid-catalyzed condensation of 2-chloroaniline, 2,5-dichloroaniline and formaldehyde in 3:1:1 molar ratio as exemplified in detail above) is preheated to a temperautre of 220° F., and mixed into the prepolymer composition. Since the equivalent weight of the mixed diamine curative is 150, and the amine equivalent of the prepolymer mixture is 450, these proportions represent about 0.9 equivalent of amine per isocyanate equivalent in the prepolymer mixture. After thorough mixing the liquid blend of prepolymer composition and curative is poured into a mold preheated to 100° C., and the mold is heated at 100° C. for 1 hour to cure the mixture to a solid, cross-linked, elastoplastic state. The mold is cooled, and the resulting solid test specimen is removed and thereafter subjected to postcuring by heating in an oven at a temperature of 70° C. for 24 hours. Physical properties of the cured specimen are measured, with the following results:

Hardness _____ 73 Shore D.
Notched Izod impact strength ____ 35 ft./lbs/in. notch.
Elongation _____ 250%.
Tensile strength _____ 7500 p.s.i.
High speed flexural impact, 18,000
  in./min. _____ Material does not break, shatter or retain any significant permanent deformation.
Performance in gear _____ Excellent.

In contrast, the same prepolymer mixture cured with 29.6 or 26.7 parts of MOCA had poor notched Izod impact strength and/or poor resistance to high speed flexural impact, and poor performance in a gear, as illustrated by the following test results:

| | 29.6 | 26.7 |
|---|---|---|
| MOCA Level: | | |
| Hardness | 74 | 74 |
| Notched Izod impact strength | 2 | 30 |
| Elongation | 350 | 340 |
| High speed flexural impact, 18,000 in./min. | (¹) | (¹) |
| Performance in gear | (²) | (²) |

¹ Shatters.
² Poor.

Also in contrast, replacement of the described prepolymer A with 100 parts of a different prepolymer (namely, a prepolymer made from 100 parts of polytetramethylene ether glycol, 46.8 parts of tolylene diisocyanate, amine equivalent 435 likewise gave poor results as illustrated by the following test results:

Hardness _____ 74
Notched Izod impact strength _____ 3
Elongation _____ 270
High speed flexural impact, 18,000 in./min. ____ Shatters
Performance in gears _____ Poor

EXAMPLE II

Example I is repeated, but a mold having a cavity in the shape of a toothed gear is employed. The gear, shown in the accompanying drawing, is 6 inches in outside diameter, 1 inch thick, has teeth ½ inch deep, and has a central axial opening for a shaft as well as a keyway. The resulting gear composed of the cured reaction product of the liquid polyurethane prepolymer composition (A) and mixed diamine curative (B) displays exceptional durability in use, being tough, long-wearing, and highly resistant to breakage of the teeth from shocks or suddenly changing heavy loads.

Having thus described my invention, what I claim and desire to protect by Letters Patent is:

1. A cured, shaped elastoplastic polyurethane article which is a reaction product of (A) and (B),
   (A) being a liquid mixture of
   (a) a liquid isocyanate-terminated prepolymer which is a reaction product of
   (i) an hydroxy-terminated ethylene glycoladipic acid polyester having a molecular weight of from 1000 to 1300, with
   (ii) 2,4-tolylene diisocyanate in amount sufficient to provide from 6.4 to 7.7% by weight of available isocyanate, based on the weight of the prepolymer, and
   (b) 3,3'-tolylene-4,4'-diisocyanate in amount sufficient to bring the available isocyanate content to 8.7 to 10% by weight, based on the weight of (a) plus (b), and
   (B) being the mixture of diamines obtained by condensation in the presence of an acid of 2-chloroaniline, 2,5-dichloroaniline, and formaldehyde in which the molar ratio of 2-chloroaniline to 2,5-dichloroaniline is in the range from 9:1 to 1:2 and the molar ratio of the sum of the two amines to form aldehyde is from about 2:1 to 10:1.
   the amount of (B) employed being sufficient to provide from about 0.5 to 1.1 equivalents of amine per isocyanate equivalent in (A), (A) and (B) being preheated before mixing them together, the preheating temperature of (A) being at least 100° F. but below its degradation temperature and the preheating temperature of (B) being above its melting temperature but below its degradation temperature, the said (B) serving as a curative for (A), and the cure being carried out initially by heating (A) and (B) in admixture in a desired shape in a mold for a period of from 3 minutes to 2 hours at a mold temperature of from 350° to 75° F. to produce a substantial cure, the finally cured mixture being a tough material resistant to high speed flexural impact and having a hardness value of from 65 to 80 on the Shore D scale.

2. A cured, shaped elastoplastic polyurethane article as in claim 1 which is a gear.

References Cited

UNITED STATES PATENTS

| | | | |
|---|---|---|---|
| 3,194,793 | 7/1965 | Kogon | 260—77.5 |
| 3,214,411 | 10/1965 | Saunders et al. | 260—75 |
| 3,297,758 | 1/1967 | Hoeschele | 260—570 |
| 3,379,691 | 4/1968 | Sundholm | 260—75 |

HOSEA E. TAYLOR, JR., Primary Examiner

H. S. COCKERAM, Assistant Examiner

U.S. Cl. X.R.

74—384; 260—77.5; 264—236, 331